Sept. 22, 1936.　　　　C. L. HOPKINS　　　　2,055,255
AUTOMATIC CLUTCH SYSTEM FOR MOTOR VEHICLES
Filed Sept. 1, 1932　　　　4 Sheets-Sheet 1

INVENTOR.
Charles L. Hopkins
BY Jones, Addington, Ames & Seibold
ATTORNEYS.

Sept. 22, 1936.  C. L. HOPKINS  2,055,255
AUTOMATIC CLUTCH SYSTEM FOR MOTOR VEHICLES
Filed Sept. 1, 1932  4 Sheets—Sheet 2

INVENTOR.
Charles L. Hopkins
BY
Jones, Addington, Ames & Seibold
ATTORNEYS.

Sept. 22, 1936.  C. L. HOPKINS  2,055,255
AUTOMATIC CLUTCH SYSTEM FOR MOTOR VEHICLES
Filed Sept. 1, 1932  4 Sheets-Sheet 4

INVENTOR.
Charles L. Hopkins
BY Jones, Addington, Ames & Seibold
ATTORNEYS.

Patented Sept. 22, 1936

2,055,255

UNITED STATES PATENT OFFICE 2,055,255

AUTOMATIC CLUTCH SYSTEM FOR MOTOR VEHICLES

Charles L. Hopkins, River Forest, Ill., assignor to Bendix Products Corporation, South Bend, Ind., a corporation of Indiana Application September 1, 1932, Serial No. 631,314

7 Claims. (Cl. 192—.01)

This invention relates to improvements in automatic clutch systems for motor vehicles.

One of the objects of the invention is to provide a system which permits coasting or free-wheeling without including in the power transmission line an overrunning clutch or similar device which makes it necessary to use the brakes to slow down the car or hold it back when descending hills. In the present system the braking power of the engine is always available without the necessity of moving or manipulating the free-wheeling button or any locking-out device, whether in free-wheeling or conventional condition.

Another object is to provide an automatic clutch system which permits the shifting of gears from a higher to a lower gear, or from a lower to a higher gear, at any car speed, without clashing of gears, even though the gear-shift mechanism be of the simplest type, thus eliminating the need of an expensive so-called "synchro-mesh" transmission.

Still another object is to lessen the wear on the clutch facings as compared with known systems in which the clutch opens and closes with the release or depression of the accelerator.

Other advantages and objects of the invention will appear from a study of the following specification.

There has recently come into extensive use what is known as the automatic clutch, in which the partial vacuum created in the intake manifold of the engine is utilized to furnish power for operating the friction clutch. In some cases a free-wheeling effect is obtained by controlling the operation of valves of the automatic clutch mechanism from the accelerator, so that the clutch opens when the accelerator is released and closes when it is depressed. In other cases the free-wheeling effect is obtained by the use of an overrunning clutch behind the transmission. The automatic friction clutch and the overrunning clutch are sometimes employed in the same power installation.

In the form of my invention shown in the drawings I have provided the usual friction clutch immediately behind the engine. This will be called the main clutch. This clutch is followed by the gear-shift mechanism or transmission unit, and this in turn by a positive clutch having parts which interlock when the clutch is closed. Means are provided (a cylinder and suction operated piston being shown) for opening and closing these clutches. These parts are so combined with other elements that when the accelerator is released both the main clutch and the rear clutch open quickly, leaving the transmission disconnected at both ends; that is, from the engine in front of it and the propeller shaft behind it. If the car is moving it may now coast or free wheel. The freeing of the transmission permits the selection of the desired gear combination without clashing, the shifting lever being moved to any position without the exercise of skill on the part of the driver. This opening of the clutches occurs during the last part of the movement of the accelerator, after the throttle has closed to the idling position. The engine is able to hold back the car at all speeds, and acts as a brake except when the accelerator is fully released, and this will be the case only when it is desired to coast. This is true even when the free-wheeling button is in.

When the accelerator is depressed the first part of its movement is accompanied by the quick closing of the main clutch, when further movement of the accelerator opens the throttle of the engine. When the engine has attained the proper speed, that is, such a speed that the parts of the rear clutch are turning together at approximately the same speed, the rear clutch suddenly closes. It will be observed that there is an interval of time between the closing of the main clutch and the closing of the rear clutch. This is, of course, necessary so as to give the engine time to come up to the speed necessary for synchronization. It will be seen that as the main clutch closes there will be no slipping of the discs on each other, as there is nothing to be brought up to the speed of the engine except the gears in the transmission and, moreover, the engine is turning only at idling speed at that time.

In the accompanying drawings, in which I have shown an embodiment of my invention:

Figs. 5, 6, and 7 show vertical sections on line

5—5 of Fig. 2, certain parts being shown in different positions in these three views;

In the sectional views of Figs. 3 to 7, inclusive, parts are in some cases broken away or omitted in the interest of clearness;

In the several figures of the drawings, 10 is the selective speed transmission unit or gear box, and 11 is the gear shift lever. The accelerator pedal is designated 12. Secured to the rock shaft 13 of the main clutch is the clutch lever 14, one arm 14a of which is engaged by a lug 15 on the clutch pedal 16 when the latter is depressed. This pedal turns loosely on the shaft 13 and is normally held in its non-depressed position by a spring 17. Also carried by the shaft 13 is a member 18 which is arranged to rock or swing on the shaft. This member is formed with a lug or projection 19 for engagement with the arm 20 of the lever 14. A pull rod 21 is connected at one end to the swinging member 18, the other end being secured to a piston 22 arranged to slide in a cylinder 23. The space 24 in front of the piston is open to the atmosphere.

At the rear end of the gear box 10 is a casing 25 which forms a housing for a small clutch and other parts, as explained hereinafter. Secured to the side of this housing is a cylindrical valve casing 26, containing two plunger-type valves 27 and 28. Valve 27 serves to establish or cut off communication between the intake manifold of the engine and the space in the cylinder 23 behind the piston 22. A conduit 29 leads from this valve to the intake manifold of the engine, while another conduit 30 leads from the valve to the space in the cylinder behind the piston. By referring to Figs. 8 to 12, inclusive, it will be seen that valve plunger 27 is formed with a groove 31 which, when the plunger is moved in from its normal position registers with two ports, 32 and 33. These ports are connected by means of the conduits 29 and 30 with the intake manifold and the cylinder, respectively. In Figs. 8, 10, 11, and 12 communication between the intake manifold and the cylinder is cut off, while in Fig. 9 communication is established, and with engine running the piston would be drawn to the rear end of the cylinder.

Figures 1, 1A, 19:
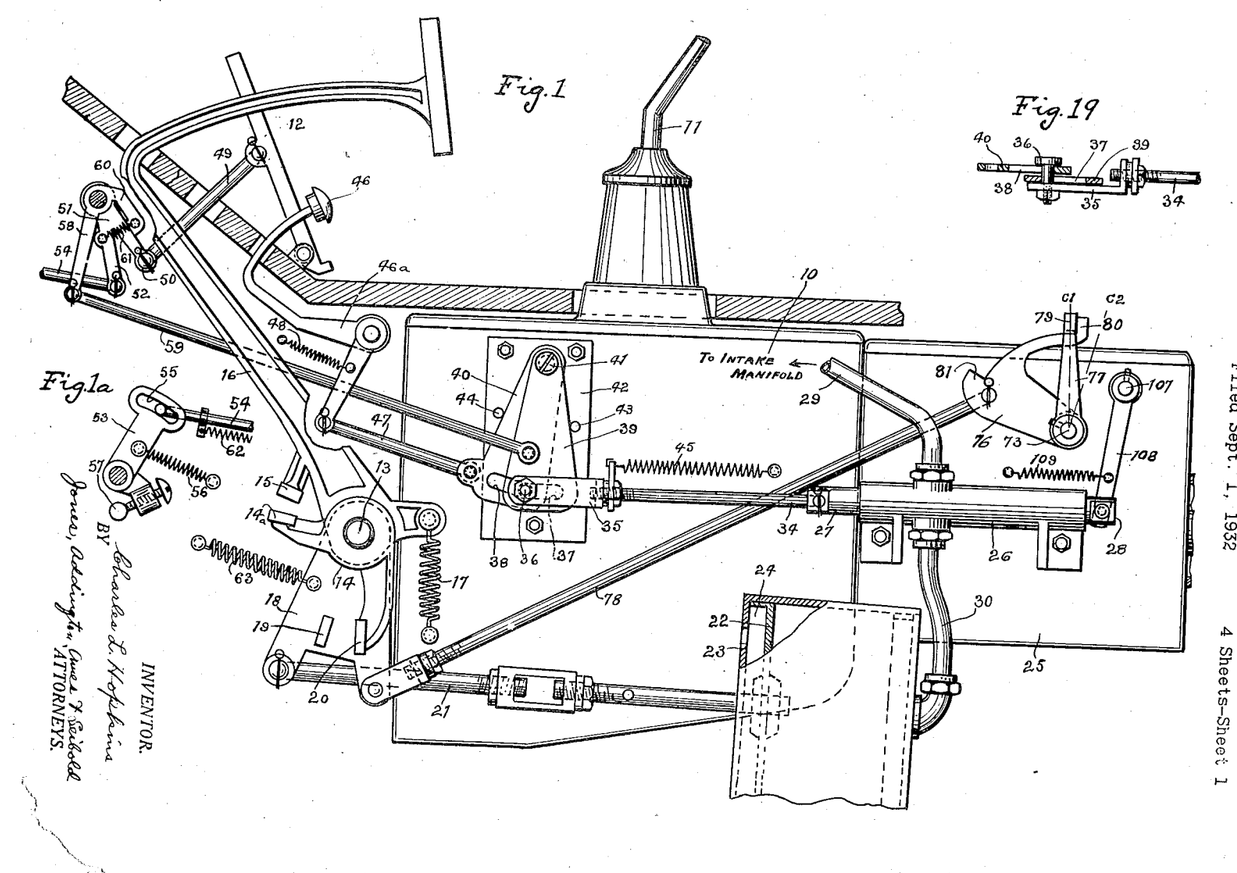
Figure 1 is a general view, showing in side elevation the variable speed transmission or gear box and some other parts of an automobile, with the elements of the improved clutch system.
Fig. 1a is an elevational view showing the throttle lever of the carburetor and the lost motion connection between this lever and the forward end of the accelerator rod.
Fig. 19 is a section on line 19—19 of Fig. 1, showing parts of the mechanism by means of which the button and accelerator control the opening and closing of the communication valve.

Referring again to Fig. 1, a rod 34 is connected at one end to valve 27. The other end of this rod is screwed into a member 35 which carries a pin or stud 36 (see Fig. 19) which extends through slots 37 and 38 in a pair of members 39 and 40. These members 39 and 40 are supported by and permitted to swing on a stud 41 carried by a supporting plate 42 which is secured to the side of the gear box 10. Stop pins 43 and 44 limit the movement of the swinging members. A spring 45 tends to move the valve 27 to the open position. In Fig. 1 these parts, like all of the other parts shown, are in the positions which they occupy normally, that is, with the accelerator not depressed and the gear shift in neutral, the engine either standing or running at idling speed.

Figures 4, 15, 16, 17, 18, 20:
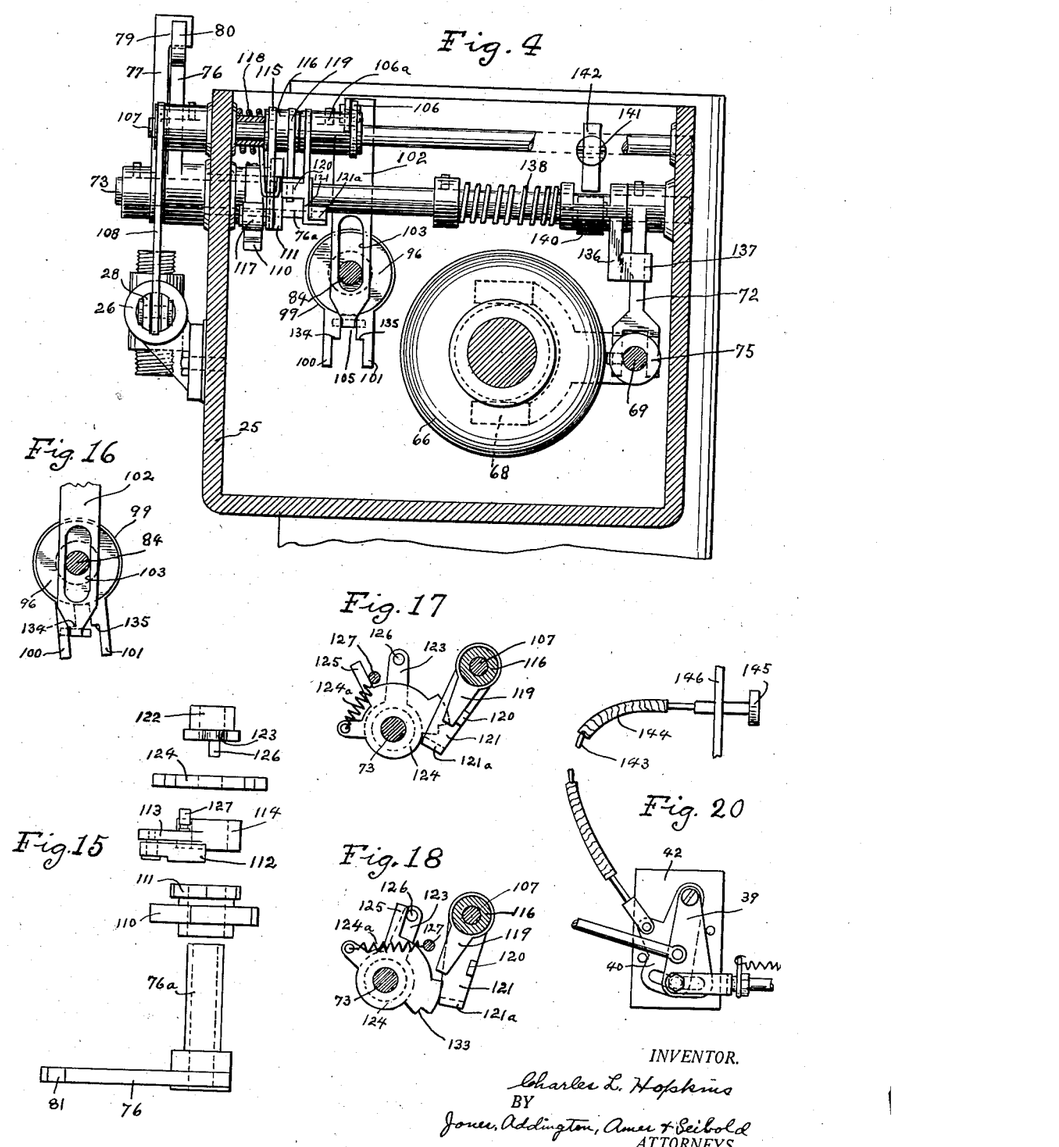
Fig. 4 shows a vertical section on line 4—4 of Fig. 3.
Fig. 15 shows some of the parts which are assembled on the rock shaft of the rear clutch, these parts being separated from each other for the sake of clearness.
Fig. 16 shows a detail of the device which prevents the closing of the rear clutch until the parts of the latter rotate at about the same speed.
Fig. 17 shows certain parts of the venting valve-operating mechanism, the parts being shown in their normal or non-coasting positions, as when the car is standing or when the accelerator is depressed and the engine is turning the drive wheels.
Fig. 18 shows the same parts as Fig. 17, but in this case the car is coasting.
Fig. 20 shows an arrangement of button and valve control slightly different from that of Fig. 1.

With member 40 in the position shown in Fig. 1 in engagement with stop pin 44, valve 27 is held closed against the tendency of spring 45 to open it. The pin 36 is at the right-hand end of the slot 38 in member 40. Means accessible to the driver of the car for swinging member 40 over against the other stop are provided, and may consist of a button 46 to be depressed by the foot of the driver. If desired this button may be placed on the instrument board, as shown in Fig. 20. In Fig. 1 the button is shown mounted on one arm of a lever 46a, the other arm of which is connected by a control rod 47 to swinging member 40. A spring 48 tends to hold member 40 against the stop 44 and the button 46 in its non-depressed position. Spring 48, as will be seen, must exert sufficient pull to overcome the tendency of spring 45 to open valve 27. When the button is depressed or pushed in so as to move member 40 over against stop 43, the valve actuating spring 45 will be permitted to move valve 27 to the open position, which establishes connection between the intake manifold and cylinder 23, the pin 36 moving to the right-hand end of slot 37.

The accelerator pedal 12 is connected by a push rod 49 with one arm 50 of a lever 51, the other arm 52 of which is connected to the throttle lever 53 (see Fig. 1a) by a push rod 54. The end of the push rod works in a slot 55 in the throttle lever 53, so as to provide a small amount of lost motion between the accelerator pedal and the throttle. A spring 56 tends to close the throttle and hold it at engine-idling position against a stop 57. When the accelerator pedal is depressed, the first part of its movement has no effect on the throttle as the lever 53 does not start to move until the end of the slot 55 is reached. Another lever is pivoted to swing on the same center as lever 51, one arm 58 of this second lever being connected by means of a rod 59 with the slotted member 39 and the other arm 60 engaging arm 50 of the first lever 51. A spring 61 tends to hold arm 60 against arm 50, so that when the accelerator is depressed the levers will swing together. When slotted member 39 reaches stop 44, arm 50 leaves arm 60, and the accelerator goes on to open the throttle of the engine. The lost motion or slack due to the slot 55 in the throttle lever is taken up at about the time member 39 reaches stop 44.

It will be seen that the first part of the movement of the accelerator, when it is depressed by the foot of the driver, will cause member 39 to swing over against the left-hand stop 44, and that movement of the accelerator pedal beyond this point will open the throttle. Now, as long as button 46 remains undepressed, as shown in Fig. 1, the movement of the accelerator pedal cannot affect the valve 27. When button 46 is depressed spring 45 will move valve 27 to its open position, with pin 36 at the right-hand end of slot 37 in member 39. If the accelerator pedal be now depressed, spring 61 will cause member 39 to move to the right, and the valve will be moved out (to the left) to the closed position. Further movement of the accelerator pedal will open the throttle and increase the speed of the engine. When the foot is removed from the accelerator spring 62 closes the throttle.

The clutch pedal 16, as already explained, is held in its normal position by spring 17. When the pedal is depressed the projection or lug 15 on the pedal engages the arm 14a of the clutch lever 14 which is secured on the rock shaft 13 of the clutch. The details of the clutch itself are not shown, as there is nothing unusual in its construction. This clutch has the usual springs for normally holding the discs or disc facings in engagement and includes in its construction a rock shaft, the turning of which in the proper direction causes the clutch to open or "disengage". The first part of the movement of the clutch pedal brings the lug 15 against the arm 14a of the lever, then further movement of the pedal opens the clutch.

As long as button 46 remains in the position shown, the clutch must be disengaged manually by the driver in the usual manner. Assume, however, that the button be depressed, the accelerator pedal remaining as shown. The valve 27, which will be called the "communication valve", is opened by the spring 45 and the suction effect due to the lowered pressure in the intake manifold of the running engine causes a partial vacuum to exist in the cylinder, resulting in the piston 22 being drawn in and lever 18 being swung to the right. Lug 19 on this lever does not engage the arm 20 on the clutch lever until the piston has moved in a certain distance. Then the clutch opens and then a further movement of the piston occurs after the clutch has disengaged. The reasons for providing slack or lost motion between the piston and the clutch at each end of the piston stroke will be explained below.

As long as the button is held down and the accelerator pedal is not depressed, the piston will hold the clutch open. If now the button be released, the pin 36 will be moved to the position shown in Fig. 1 and communication valve 27 will be closed. Or if the button be still depressed and the accelerator pedal 12 be depressed the same effect will be had; then further movement of the accelerator will increase the speed of the engine. With communication between engine and cylinder cut off by the closing of valve 27 the clutch will not be permitted to close, however, unless air is admitted to the cylinder behind the piston. The purpose of valve 28, which will be called the "venting" valve, is to control the admission of air to the cylinder after valve 27 has been closed. When the piston has returned sufficiently to permit the clutch to fully close, the lug 19 leaves the end 20 of the clutch lever and a spring 63 moves the piston and the lever 18 the rest of the way back.

Within the housing 25 is a positive clutch comprising two members having interengaging teeth. This might be termed the rear clutch. One of its members, designated 64, is splined to the rear end of the shaft 65 which extends from the gear box and thus turns with it and has movement lengthwise of the shaft. The other member 66 is secured to a short shaft 67 which extends rearwardly to the universal joint (not shown). The sliding member 64 of this rear clutch is moved by a yoke 68, carried by a slide rod 69 supported at its ends in apertures in bosses 70 and 71 cast in the housing 25.

The slide rod 69 is moved back and forth by an arm 72 which extends downwardly from a rock shaft 73 and engages collars 74 and 75 on the slide rod 69. This rock shaft 73 is journalled at one end in the housing 25, the other end being supported by and turning in the elongated hub 76a of a lever 76, this hub passing through the wall of the housing 25 and extending into the space therein. An arm 77 is secured to the projecting end of shaft 73. Lever 76 is connected by a rod 78 to lever 18 so as to be swung through an arc when the piston moves in the cylinder 23. The arm 77 has a lug 79 projecting into the path of a lug 80 on the lever 76.

Figure 5:
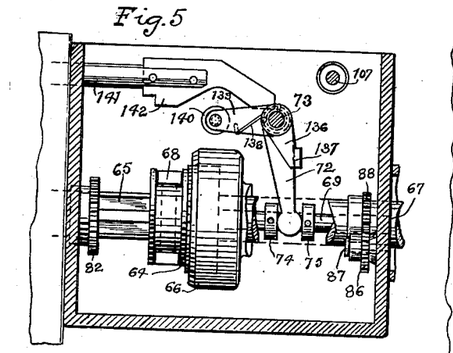
Figure 6:
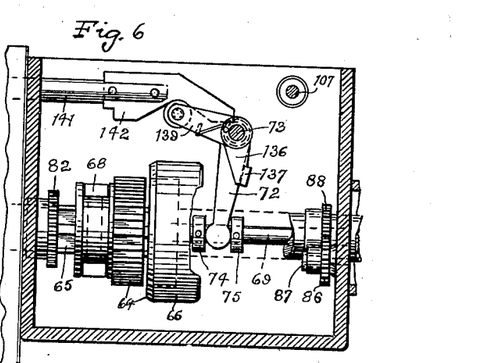

With the parts in the positions shown in Fig. 1 the positive rear clutch is held closed, as seen for instance in Fig. 5, by the spring 63. To open and close this clutch, arm 77 must be swung through the arc included between the lines marked C1 and C2. When the piston is drawn into the cylinder the main clutch is fully opened before the rear clutch starts to open. As explained above, the first part of the movement of the piston is used up in bringing the lug 19 of lever 18 into contact with the arm 20 of the clutch lever 14. Further movement of the piston opens the main clutch; then a projection 81 on lever 76 engages lug 79 on the rear clutch arm 77 and opens the rear clutch. Lever 76 and arm 77 are now in the positions shown in Fig. 13. It is to be understood that the whole movement of the piston and other parts takes place very quickly.

It will be seen that pressure of the parts of the rear clutch upon each other is removed before this clutch is opened, because of the fact that the engine has been cut off by the opening of the main clutch. Assuming that the button 46 is held down by the foot of the driver and the car is being moved along the road by power from the engine. Now, if the accelerator pedal is suddenly released, the engine will drop to idling speed while at the same time the main clutch will open to release the engine, this being immediately followed by the opening of the rear clutch, and the car is permitted to coast. Or suppose that instead of coasting, the driver desires to reduce the speed of the car by partly closing the throttle by means of the accelerator. With a free-wheeling system which includes an overrunning clutch in the power transmission line this cannot be done when in free wheeling, but it is necessary for the driver to shift his foot from the accelerator to the brake pedal when he desires to reduce the speed of the car. In the present system the car speed may be decreased as well as increased by varying the pressure on the accelerator, unless the accelerator is completely released. In descending hills the braking power of the engine may be used, whether the button be depressed or not. This will be discussed further following an explanation of the means provided for insuring the closing of the clutches at the proper times and in the proper order.

It will be understood that after the main clutch and the rear clutch have both opened, as when coasting, the interlocking members of the rear clutch will rotate at different speeds. The selective transmission unit is cut off from the engine ahead of it and from the drive wheels of the car, and, of course, the gears will stop turning. The rear member 66 of the rear clutch turns with the propeller shaft, while the other clutch member 64 stops when the gears stop. For this reason it is necessary that when the clutches close the main clutch closes first. Before the rear clutch is permitted to close the speed of the engine, which is now idling, must be brought up to approximately that corresponding to the speed of the car so that the interlocking members of the rear clutch may be brought together without clashing. Means are provided, therefore, whereby the rear clutch is prevented from closing unless or until the engine speed is such that the interlocking members of the rear clutch are revolving at substantially the same speed.

Figure 14:
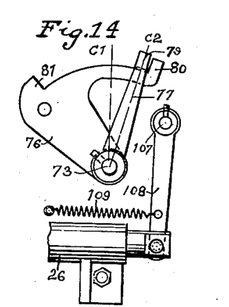
Fig. 14 shows these parts in their positions when the main clutch has closed and before the second clutch has closed.

It will be recalled that when the piston 22 is drawn into the cylinder by the suction effect from the engine, the main clutch is opened first, followed immediately by the opening of the second clutch, the engine meantime slowing down to idling speed. When the piston moves in the other direction the lever 76 moves to the position shown in Fig. 14, the main clutch meantime closing. Then the piston is arrested until the engine speed has been brought to the proper point. Then the piston completes its stroke, lug 80 engaging lug 79 and closing the rear clutch. The means whereby the piston is arrested and prevented from completing its stroke until the proper time, will now be described.

Shaft 65 carries a spur gear 82 fast on the shaft and meshing with a spur gear 83 which is carried by a shaft 84 near one end of the latter and free to turn thereon. Shaft 84 is journalled at its ends in the casing 25 and carries a spur gear 85 fast on the shaft at the opposite end from gear 83. Gear 85 meshes with a small spur gear 86 which turns on a stud 87 and meshes with a spur gear 88 on shaft 67. Gears 82, 83, 85 and 88 have pitch diameters such that gear 85, fast on the shaft, and gear 83, loose on the shaft, normally, that is, when the rear clutch 64—66 is closed, turn at the same speed. Due to the presence of the small gear 86 interposed between gears 85 and 88, gear 85 and the shaft to which it is secured normally turn in the opposite direction from loose gear 83.

On the same hub with gear 83 is a miter gear 89, which together with gear 83 turns loosely on shaft 84. Facing miter gear 89 is another miter gear 90, fast on shaft 84. A sleeve 91, loosely turning on shaft 84, has secured to it a bracket 92 which carries a stud 93. On this stud turns loosely a third miter gear 94. Gears 89 and 90 turn in opposite directions and at like speed when the rear clutch is closed. Under these conditions miter gear 94 simply turns on its own axis, but under conditions where spur gears 89 and 90 do not turn in opposite directions and at the same speed, gear 94 will be carried around shaft 84. Bracket 92 and sleeve 91 will turn on the shaft and permit gear 94 to remain in proper mesh with both of the other miter gears. When gears 89 and 90 revolve in opposite directions and at different speeds sleeve 91 will turn at a speed equal to one-half the difference between the speeds of these two gears, and in the same direction as the faster moving gear.

Secured to sleeve 91 at its end opposite the miter gears, is a flange 96. Sliding on the sleeve is a flanged collar 97 urged toward flange 96 by a light spring 98. Between the two flanges is arranged a flat disc-like member 99 having two downwardly projecting tongues 100 and 101. This member is lightly gripped between the two flanges and thus tends to turn with these flanges whenever spur gear 94 revolves around shaft 84. A flat bar-like latch member 102, formed with a slot 103 to accommodate shaft 84, is formed with a tongue 104 which normally prevents member 99 from turning. The space between the tongues 100 and 101 is of less width at its upper part, thus forming a notch 105 into which the tongue on the latch member fits when the latch member is in its normal, raised position.

The upper end of latch member 102 is pivotally secured to the outer end of an arm 106 which has a hub 106a secured on a rock shaft 107. This rock shaft extends outside casing 25 and carries on its outer end an arm 108, fast on the shaft. The lower end of this arm is connected to venting valve 28. A spring 109 moves the venting valve in when permitted to do so.

By referring to Figs. 8 to 12, inclusive, it will be seen that venting valve 28 is open at both ends of the movement of the plunger, and that it is closed at a certain position between these extremes. The miter gears and other parts associated with shaft 84 together form a device for arresting the return movement of the valve plunger at the intermediate, closed position when the main clutch has engaged, and holding it until the parts of the rear clutch are brought to substantially the same speed.

Figure 2:
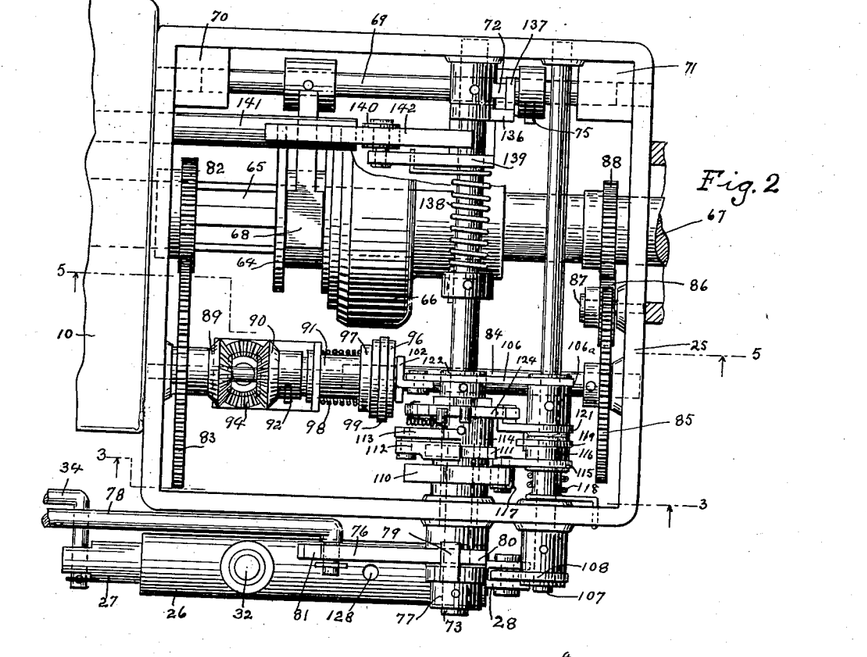
Fig. 2 is a top plan view of the rear clutch box, the cover of the box being removed to expose the clutch and other parts enclosed in this box.
Figure 3:
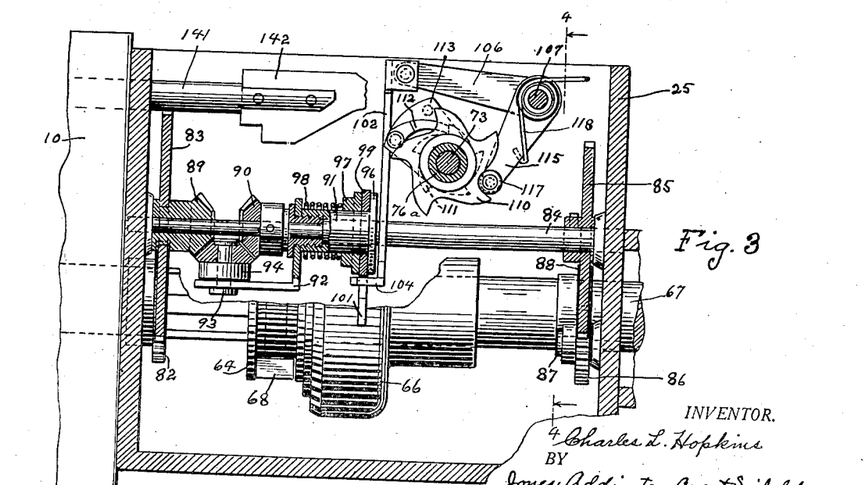
Fig. 3 is a vertical sectional view, the section being taken on line 3—3 of Fig. 2 looking in the direction of the arrows.

Referring particularly to Figs. 2, 3, and 15, it will be seen that a five-pointed star wheel 110 is loosely sleeved on the elongated hub of lever 76. This star wheel consists of or comprises five cams and is free to turn on the hub of lever 76. Integral with this star wheel is a five-point ratchet 111 engaged by a pawl 112. This pawl is carried by a short arm 113 having a hub 114 fast on the hub 76a of lever 76 so that it will turn with the lever. An arm 115 is carried by rock shaft 107, the hub 116 of this arm turning loosely on the shaft. A cam follower, consisting of a roller 117, carried by arm 115 is kept in contact with the cam wheel by a spring 118. The hub of arm 115 carries also a short arm 119 which engages a projecting lug 120 on an arm 121 on the hub 106a of arm 106.

Fast on shaft 73 is the hub 122 of an arm 123. Between this hub 122 and hub 114 is a cam plate 124, turning loosely on the shaft. This cam plate has an arm 125 extending radially from it into the path of a pin 126 on arm 123, and also into the path of a pin 127 on arm 113. Arm 121 has its lower end bent to form a foot 121a which engages the edge of cam plate 124. A spring 124a tends to turn the cam plate clockwise. This spring is attached at one end to the cam plate and at the other to pin 127. The cam plate, in combination with the automatic valve arresting device hereinabove described, controls the return of the venting valve after it has been moved out.

Figure 8:
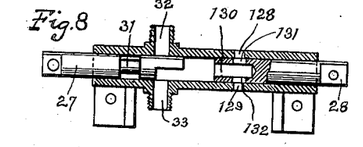
Figs. 8 to 12, inclusive, show the valve cylinder with the communication and venting valve in different positions.
Figure 9:
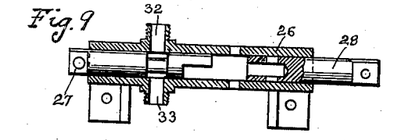

Referring now to Fig. 8, which shows the valve plungers in their normal positions, or the positions which they occupy when the accelerator 12 and button 46 are not depressed (see Fig. 1), it will be observed that the valve casing 26 has two vent ports 128 and 129, as well as the other ports leading to the engine manifold and vacuum cylinder, respectively. Plunger 27, when in the position shown in Fig. 8, closes port 32 and thus cuts off the vacuum from the cylinder and conduit 30 leading to it, but the cylinder and conduit are in communication with the atmosphere through a passage 130 formed in valve plunger 28 and ports 131 and 132 in the plunger, as these ports are in register with vent ports 128 and 129.

Figure 13:
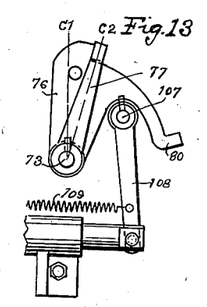
Fig. 13 shows certain parts, including the venting valve, in the positons which they occupy when the car is coasting.

As already explained, if the accelerator be released while button 46 is depressed, the piston 22 in the vacuum cylinder will be drawn back. The first part of the movement of member 18 will close the space between lug 19 and arm 20 of the main clutch lever. Further movement of the piston opens the main clutch, then still further movement permits projection 81 on lever 76 to engage lug 79 on rear clutch arm 77 and open the rear clutch. During this movement of the piston and the lever 76 the star wheel 110 and pin 127 turn clockwise. The star wheel swings arm 115 back and turns rock shaft 107 in the direction to move valve 28 to the position shown in Fig. 9. This figure shows the positions of the valves when the clutches are held open by the piston for coasting or gear shifting. Fig. 13 shows the positions of lever 76, rear clutch arm 77, valve-operating arm 108, and the valve, while Fig. 18 shows some of the other parts which are located within the casing.

It will be seen that the star wheel, which has turned through one-fifth of a revolution, has permitted the roller cam follower 117 to drop back to its original, normal position, thus acting as a detent to hold the star wheel against turning backward. The venting valve, however, is for the present held against the tendency of spring 109 to return it by the engagement of arm 121 with cam plate 124. When the star wheel turned forward, that is, clockwise, arm 119 on the same hub as arm 115, which carries the roller, engaged lug 120 on arm 121, thus turning rock shaft 107. At the same time, cam plate 124 was permitted to move clockwise a certain distance, but was prevented from following pin 127 beyond the point where arm 123 stopped. This arm has, of course, only the same amount of angular movement as the rear clutch arm 77, and moves with it, while pin 127 has the same amount of angular movement as lever 76 and moves with it.

Figure 10:
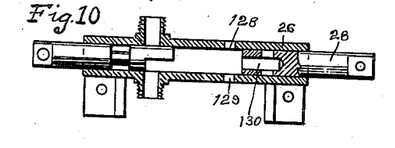
Figure 11:
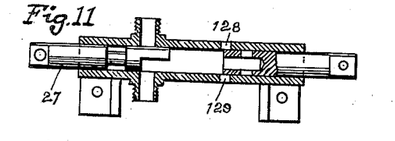
Figure 12:
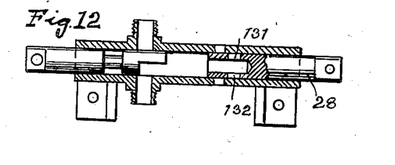

If now the button be released or the accelerator depressed, communication valve 27 will return to normal position, but venting valve 28 will at first be held in its present position by the cam plate. Fig. 10 shows the valves at this time, and it will be noted that the suction is cut off and cylinder 23 vented. This permits the piston to be drawn out by spring 63 until pin 127 engages the arm on the cam plate and moves the latter slightly. The cam plate is formed with a quick drop and a shoulder at 133. Foot 121a on lever 121 drops upon this shoulder and the valve is held at the position shown in Fig. 11, the vent ports being nearly closed. The engagement of pin 127 with the arm on the cam plate occurs before lug 80 on lever 76 reaches the lug on clutch arm 77, and while the main clutch is closing, but just before this clutch has completely closed. The clutch plates move toward each other very quickly at first, but do not come together with a shock because of the restricted venting during the last part of the movement. There is no destructive slippage of the clutch plates even with this rapid closing of the clutch, because the rear clutch is open and only the gears in the transmission have to be started or speeded up.

Due to the fact that the rear clutch is open, there is relative movement between the parts 64 and 66 of this clutch, and consequently sleeve 91, flange 96 and flange 97 are slowly turning in one direction or the other, depending on which part of the rear clutch turns faster. Plate 99, therefore, has been turned slightly on shaft 84. The tongue 104 on the lower end of latch member 102 prevents plate 99 from revolving. Lever 76 continues to move to the left for a short time after the main clutch is closed. Then a point is reached where the cam plate, which has a quick drop at 135, would permit the valve to move the rest of the way and open again were it not for the latch bar 102. At the point where foot 121a on the arm 121 passes off the cam plate, the valve is permitted to move only a short distance farther in, because tongue 104 on the latch bar engages one of the shoulders 134 or 135 on the plate 99, as seen in Fig. 16. The venting valve is thus arrested at the position shown in Fig. 12 with the vent ports closed. This prevents the piston in the vacuum cylinder from moving any farther for the present, and, of course, the rear clutch does not close.

It will be remembered that when the accelerator is depressed it moves a certain distance before the throttle is affected. With the button down, pressure on the accelerator causes the main clutch to close quickly, usually before the throttle has started to open, or, at most, before the engine has increased its speed greatly. Suppose the car were coasting. The rear member 66 of the clutch would be turning while the front member 64 would probably not be turning, as the engine would be cut off by the main clutch being open. Then when the main clutch closed the speed of member 64 would still be less than that of member 66; therefore the engine should have its speed increased until these members were turning at something like the same speed. It will be seen that as long as the plate 99 is urged to turn, the tongue 104 on the latch bar will remain caught on the shoulder 134, as seen in Fig. 16. (If the engine were turning too fast the latch would catch on shoulder 135.) As member 64 is now turning with the engine, whose speed is increasing, the members will very soon turn at the same speed. The instant that member 64 turns faster than member 66, plate 99 will start to turn the other way. This causes the tongue to slip off the shoulder and go up into the notch 105, causing arm 106 to fly up and valve arm 108 to swing to the left, carrying venting valve 28 to the position shown in Fig. 8. The venting valve being now open, the piston is drawn out to the end of its stroke by spring 63, the projection 80 on lever 76 engaging lug 79 on arm 77 and closing the rear clutch.

It will be seen that the above explanation of the action of the synchronizing means is true when the gear shift is in second or first gear, as well as when it is in high, even though the engine runs faster relatively to the speed of the car, and that in shifting from one gear ratio to another the same action takes place. The mechanism described above does not, however, provide for starting a standing car.

Figure 7:
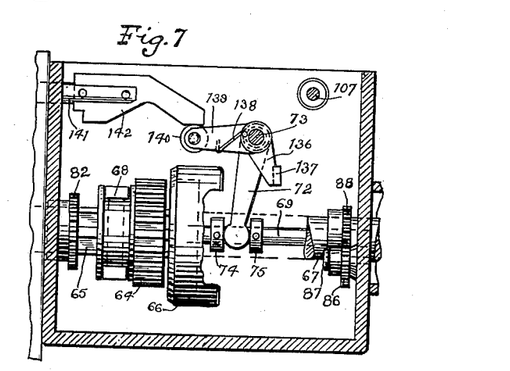

When starting the car, either in low or in reverse, it is necessary that the rear clutch close first and that the main clutch close slowly so as to permit some slipping of the clutch until the car gets under way. To accomplish this a lever is pivoted on shaft 73, one arm 136 of which extends downwardly and has a lug 137 which may engage the arm 72. A spring 138, coiled around shaft 73, tends to turn the lever on the shaft and holds the lug 137 against arm 72. The other arm 139 of the lever carries a roller 140. When the gear shift on the car is put into either low or reverse, the right-hand slide rod in the transmission is slid either forwardly or toward the rear. This rod is made longer than usual so that it extends back into the casing of the rear clutch. This rod, designated 141, has secured to its rear end a cam plate 142, so formed that when the rod is in an intermediate position the movement of lever arm 139 will not be interfered with. This position of the rod corresponds to neutral, second and high. When the rod has moved endwise, as when in low or reverse, the cam engages roller 140 and depresses arm 139, as seen in Fig. 7. This carries lug 137 away from arm 72, and stores energy in spring 138, tending to turn shaft 73 and close the rear clutch.

When starting the car with the button depressed, the accelerator is, of course, released and the piston is drawn in, opening both clutches. When the gear shift lever is put in low or reverse, as desired, cam plate 142 presses down lever arm 139 and spring 138 tends to close the rear clutch. This is at first prevented by the engagement of projection 81 on lever 76 with the lug on arm 77. Then as the accelerator is depressed, the piston starts to run out and spring 138 causes arm 77 to follow the projection 80 back, closing the rear clutch. This arrangement of plate cam, lever and spring thus causes the rear clutch to close during the first part of the movement of the piston when in low or reverse.

Now it will be observed that in this case pin 126, which moves with the clutch arm 77, turns the cam plate 124 counterclockwise earlier than pin 127 would have done it. Valve 28 is thus permitted to move at once to the position shown in Fig. 11, where the vent ports are nearly closed. This partial venting permits the piston to be drawn slowly out of the cylinder by spring 63 and the clutch springs, and the clutch closes slowly, the plates slipping on each other until the car gets under way. After the clutch has closed the piston and lever 76 continue to move and pin 127 engages arm 125 on cam plate 124, returning the cam plate to its normal position, as seen in Fig. 17. This permits the venting valve to go to the position shown in Fig. 8, where the vent ports are open, unless latch bar 102 is held by one of the shoulders 134, 135, in which case the valve would be permitted to move only to the position seen in Fig. 12. This is immaterial, as both clutches have already closed.

As explained hereinabove, when the accelerator is depressed after the clutches have been opened for coasting or shifting from one gear ratio to another, the closing movements of these clutches are controlled by valve 28 which regulates the admission of air to the cylinder 23 behind the piston 22. Atmospheric pressure on the front of the piston opposes spring 63 and the springs of the main clutch and prevents them from closing the clutches until this pressure is balanced by atmospheric pressure behind the piston. This would be true whether the piston had been moved back by suction from the engine intake or by power derived from some other source.

The button which, when moved in, affects the change from the free-wheeling condition to the "conventional" condition may, if desired, be located on the instrument panel instead of at the floor, as seen in Fig. 1. In this case button 46, lever 46a and rod 47 are replaced by a push-pull wire 143 sliding in a tube 144, as shown in Fig. 20. At the upper end of this wire is a button 145 supported by the panel 146 and arranged to be drawn out or pushed in. When the button is out the slotted member 40 is held in its left-hand position, as shown, and movement of the accelerator does not affect valve 27. When the button is in, member 40 is held in its right-hand position and valve 27 is permitted to move in when the accelerator is released and to be drawn out when the accelerator is depressed.

Further modifications will be apparent to those skilled in the art and it is desired, therefore, that the invention be limited only by the prior art and the scope of the appended claims.

Having thus described my invention, what I claim and desire to secure by Letters Patent is:

1. In a motor vehicle having an engine, a variable speed transmission, a clutch between them and an accelerator for the engine, a second clutch behind said transmission, and automatic means for opening and closing said clutches arranged to open both clutches substantially at the same time, said means being further arranged to close one of said clutches when the accelerator is moved to increase the speed of the engine and to close the other clutch only when the speed of the engine has increased to the point where the parts of said other clutch turn at substantially the same speed.

2. In a motor vehicle having an engine, a variable speed transmission and a friction clutch on one side of said transmission, a positive clutch on the other side of said transmission, power operated manually controlled means for opening and closing said clutches, and means whereby the gear reduction ratio selected in the transmission determines which clutch shall close first.

3. In a motor vehicle having an engine and a variable speed transmission, a clutch between the engine and the transmission, a second clutch behind the transmission, manually controlled means for opening said clutches, and power-operated automatic means arranged to close the first-named clutch when the engine speed is increased from idling speed and to thereafter close the second clutch when the parts of said second clutch turn at substantially equal speed.

4. In a motor vehicle having an engine and a variable speed transmission, the combination of two clutches, one on each side of said transmission, and means for opening and closing said clutches arranged to open both clutches substantially simultaneously and including fluid pressure means for controlling the closing of said clutches, and means for controlling said fluid pressure means comprising a valve and operating means therefor, said operating means comprising parts driven at speeds proportional to the speeds of the interengaging parts of one of the clutches and arranged to so control said valve as to cause said one clutch to close only when its interengaging parts turn at substantially equal speeds.

5. In a motor vehicle having an engine and a variable speed transmission, a clutch between the engine and the transmission, a second clutch behind the transmission, and means for opening and closing said clutches including spring means tending to close said clutches, means arranged to oppose and control said spring means, and means for controlling said spring-opposing means, said last-named means comprising parts driven at speeds proportional to the speeds of the interengaging parts of one of the clutches and arranged to so control said spring opposing means as to cause said one clutch to close only when its said parts turn at substantially equal speeds.

6. In a motor vehicle having an engine and a variable speed transmission, the combination of two clutches, one ahead of and the other behind the transmission, and means for opening and closing said clutches arranged to open both of said clutches substantially simultaneously and including fluid pressure means for controlling the closing of said clutches comprising a movable piston arranged to cause one of said clutches to close during a part of the movement of said piston and the other clutch to close during further movement of the piston in the same direction, and automatic means arranged to delay the further movement of the piston after said one clutch has closed until the interengaging parts of said other clutch have substantially no relative movement.

7. In a motor vehicle having an engine and a variable speed transmission, the combination of a clutch between the engine and the transmission, a second clutch behind said transmission, and means for opening and closing said clutches arranged to open both of said clutches substantially simultaneously and including fluid pressure means for controlling the closing of said clutches comprising a piston so arranged that one of said clutches closes during a part of the movement of the piston and the other clutch closes during further movement of the piston, valve means for controlling the piston, and automatic means for controlling the valve means comprising elements driven at speeds proportional to the interengaging parts of the second clutch and arranged to delay further movement of the piston after the first-named clutch has closed until the interengaging parts of the second clutch revolve at substantially the same speed.

CHARLES L. HOPKINS.